United States Patent
Lim

(12)
(10) Patent No.: US 6,330,215 B1
(45) Date of Patent: Dec. 11, 2001

(54) REWRITABLE DISC AND METHOD OF CONTROLLING RECORDING OF THE SAME

(75) Inventor: Jong Rak Lim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/275,193

(22) Filed: Mar. 23, 1999

(30) Foreign Application Priority Data

Mar. 24, 1998 (KR) .................................................. 98-10200

(51) Int. Cl.[7] .................................................. G11B 7/00
(52) U.S. Cl. ...................... 369/53.2; 369/53.22; 369/47.1
(58) Field of Search ............................. 369/32, 33, 275.3, 369/47.23, 47.1, 53.23, 53.26, 53.28, 53.2, 53.22

(56) References Cited

U.S. PATENT DOCUMENTS

| | | | |
|---|---|---|---|
| 5,592,447 | * 1/1997 | Takishima | 369/53.26 X |
| 5,970,029 | * 10/1999 | Shinada | 369/33 |
| 6,167,002 | * 12/2000 | Taira et al. | 369/32 |

* cited by examiner

*Primary Examiner*—Muhammad Edun

(57) ABSTRACT

A rewritable disc that is adaptive for indicating whether a single-sided recording layer or a double-sided recording layer exists. The disc has an identification information for indicating whether any one of the single-sided recording layer and the double-sided recording layer exists. The identification information is preformatted on a specified region, such as a control data area, a lead-in area and a lead-out area, etc., of the disc.

14 Claims, 7 Drawing Sheets

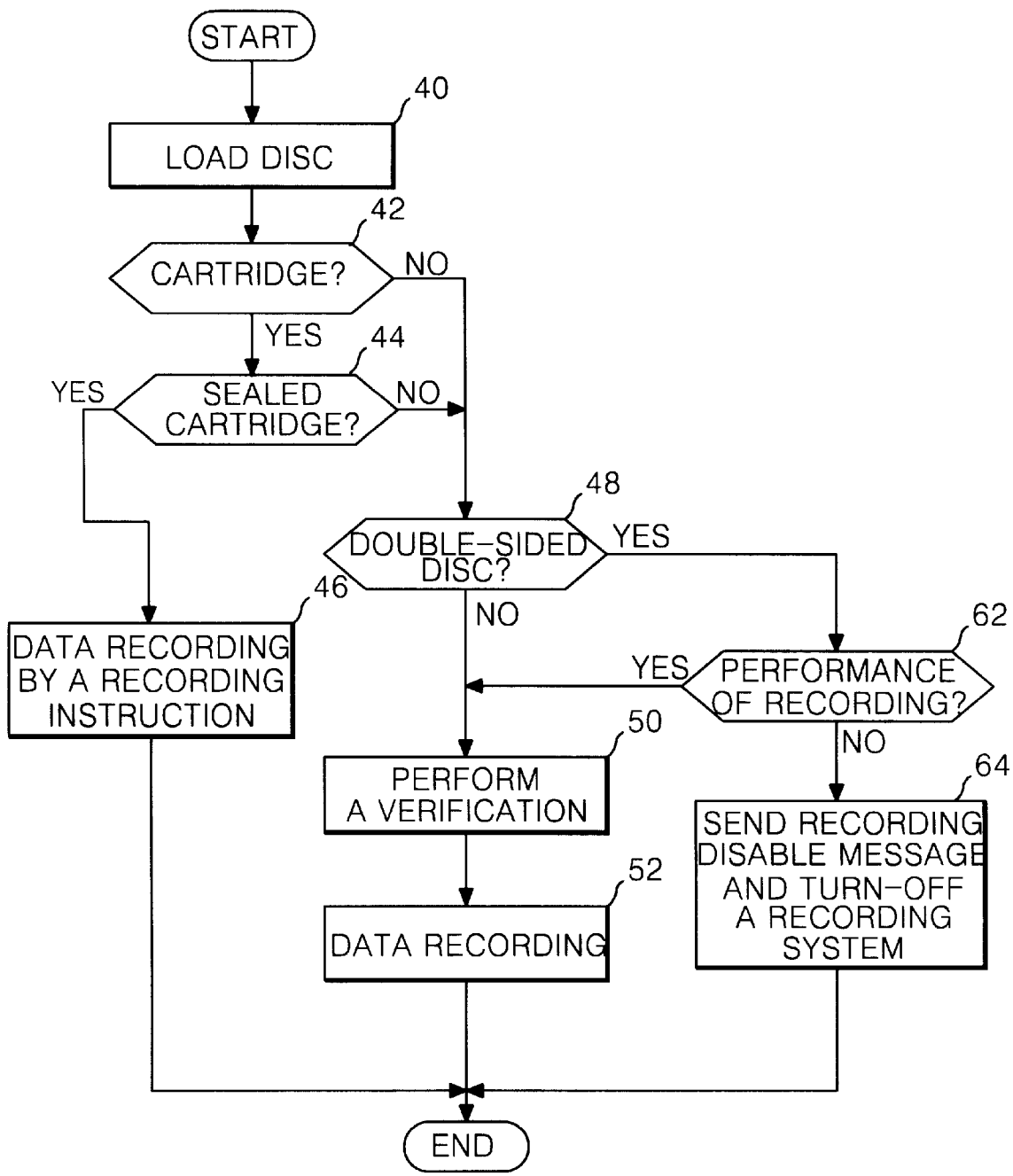

REWRITABLE DISC AND METHOD OF CONTROLLING RECORDING OF THE SAME

BACKGROUND OF THE INVENTION

1. Field of the Invention

This invention relates to a recording medium, and more particularly to a disc having an identification information for indicating whether a single-sided or a double-sided recording layer exists. Also, this invention is directed to a disc recording control method for controlling a recording of data in accordance with whether a disc has a single-sided or a double-sided recording layer.

2. Description of the Prior Art

Generally, a disc can be classified into three types, such as a read-only memory (ROM) type, a write once read many (WORM) type and a rewritable type capable of a repetitive recording, depending upon whether or not it has a repetitive recording ability. The ROM type disc includes a CD (compact disc)-ROM and a DVD (digital versatile disc)-ROM, etc., and the WORM type disc includes a CD-R (recordable) and a DVD-R (recordable). On the other hand, the rewritable disc includes a CD-RW (rewritable), a DVD-RW (rewritable), DVD-RAM and a magneto-optical disc (MOD), etc.

Further, a disc may be classified as a single-sided disc or a double-sided disc in accordance with its structure. As shown in FIG. 1, a single-sided disc consists of a single-sided recording layer 10 disposed between a transparent substrate 12 and a dummy substrate 14 and has a thickness of 1.2 mm. Such a single-sided disc allows a laser light beam to be irradiated, via the transparent substrate 12, onto the recording layer 10 so as to access data. In contrast, the double-sided disc has two recording layers 10A and 10B disposed between a first substrate 12A and a second substrate 12B. The first recording layer 10A allows data to be accessed by a light beam received via the first substrate 12A while the second recording layer 10B allows data to be accessed by a light beam received via the second substrate 12B. The double-sided disc with such double-sided recording layers 10A and 10B is capable of recording data equal to twice the recording capacity of the single-sided disc. However, the data recorded on each side of the double-sided disc is not continued because the double-sided disc is presently only a two single-sided discs joined together. This is caused by the fact that the double-sided disc is not distinguished from the single-sided disc by means of a disc driving apparatus. In order to assure a continuity of data in the double-sided disc, the disc requires identification information for indicating whether the single-sided or the double-sided recording layer exists.

When the rewritable disc experiences several recording/reproduction operations, its recording layer may deteriorate. Also, in the rewritable disc, unwritable defect regions due to a deterioration of the recording layer, a scratch on the surface, fingerprints and dust, etc. may occur over a considerable range of effective recording area. In order to overcome such problems, the rewritable type disc is stored within a cartridge for protecting it from exterior contamination sources and impact. Such a cartridge is largely classified into a sealed type and an open-closed type depending upon whether or not it can be opened and closed. The sealed type cartridge is applicable to both the single-sided disc and the double-sided disc, whereas the open-closed type cartridge is preferably applied to only the single-sided disc. The open-closed type cartridge has a structure that allows a user to easily insert or take out a disc. In other words, a disc to be received within the open-closed type cartridge can be removed from the cartridge (a "bare disc"). Since such two types of cartridges have the same external shape, they can be identified by the opening or closing of sensor holes 16 as shown in FIG. 3. In other words, a disc driving apparatus recognizes the two types of cartridges depending upon whether the sensor holes 16 have been opened or closed.

As described above, use of the rewritable disc is liable to generate an error at the time of recording or reproduction because defect areas develop with use. Due to this, the rewritable disc is subject to a verification upon recording. Such a verification is to detect any defects in the recording region by recording a test data onto an area for recording and reproducing the recorded test data, and then by checking if the reproduced data is identical to the recorded data. Position information for the defective recording area is usually recorded on a lead-in area and so forth. Accordingly, the disc driving apparatus refers to the position information for defective areas to be recorded on the lead-in area and so forth during the recording and reproduction of information, and manages the defective areas. The defective areas have a higher probability to be generated at a disc received within the open-closed type cartridge rather than within the sealed type cartridge. Therefore, a recording of information is performed without verification for a disc received within the sealed type cartridge, whereas it is preferably performed after verification for a disc received within the open-closed type cartridge. Furthermore, the double-sided disc is liable to be contaminated relative to the single-sided disc by fingerprints and dust, etc. when it is taken out from the cartridge. In view of this, it is desirable that the double-sided disc should not be received within the open-closed type cartridge. The need for verification according to the type of cartridge and the type of disc can be described in the following Table 1.

TABLE 1

|  |  | Disc Type | |
|---|---|---|---|
|  |  | Single-sided Disc | Double-sided Disc |
| Cartridge Type | Sealed Type | Verification (X) | Verification (X) |
|  | Open-Closed Type (Including Bare Disc) | Verification (O) | (X) |

As seen from the Table 1, the sealed type cartridge permits a recording of information to be performed without a verification because it restricts the external exposure of a disc absolutely, whereas the open-closed type cartridge involving the state of a bare disc must be necessarily verified prior to a recording of information because a disc may be exposed to outside elements. Accordingly, the disc driving apparatus verifies a disc type depending on the two types of cartridges.

However, the double-sided disc received only within the sealed type cartridge may be used in a state of bare disc or may be used in a state received within the open-closed type cartridge due to a user's intentional destruction of sealed type cartridge. In this case, the double-sided disc occurs driving errors because it is dealt with the bare type single-sided disc or the open-closed type cartridge by the disc driving apparatus. Also, since the double-sided disc exposed to the outside occurs many defective areas by fingerprints and dust, etc., it must waste a longer time than the single-sided disc when it is verified like the single-sided disc.

SUMMARY OF THE INVENTION

Accordingly, it is an object of the present invention to provide a rewritable disc that is adaptive for indicating whether a single-sided or a double-sided recording layer exists.

Further object of the present invention is to provide a disc recording control method and apparatus that is adaptive for controlling a recording operation appropriately depending on whether a disc has a single-sided or a double-sided recording layer.

In order to achieve these and other objects of the invention, a rewritable disc according to one aspect of the present invention includes an identification information for indicating whether any one of a single-sided recording layer and a double-sided recording layer exists.

A disc recording control method according to another aspect of the present invention includes the steps of checking that a disc has been received within an open-closed type cartridge, determining that the disc is a double-sided layer, and restraining a recording of the disc when the disc is a double-sided disc.

A disc recording control method according to still another aspect of the present invention includes the steps of checking that a disc has been received within an open-closed type cartridge, determining that the disc is a double-sided layer, and determining a recording of the disc when the disc is a double-sided disc.

A disc recording control apparatus according to still another aspect of the present invention includes means for checking that a disc has been received within an open-closed type cartridge, means for determining that the disc is a double-sided layer, and control means for restraining a recording of the double-sided disc depending on outputs of the cartridge checking means and the disc determining means.

A disc recording control apparatus according to still another aspect of the present invention includes means for checking that a disc has been received within an open-closed type cartridge, means for determining that the disc is a double-sided layer, and control means for determining a recording of the double-sided disc depending on outputs of the cartridge checking means and the disc determining means.

BRIEF DESCRIPTION OF THE DRAWINGS

These and other objects of the invention will be apparent from the following detailed description of the embodiments of the present invention with reference to the accompanying drawings, in which:

FIG. 8 is a flow chart for explaining a disc recording control method according to another embodiment of the present invention.

DETAILED DESCRIPTION OF THE PREFERRED EMBODIMENT

Figure 4:
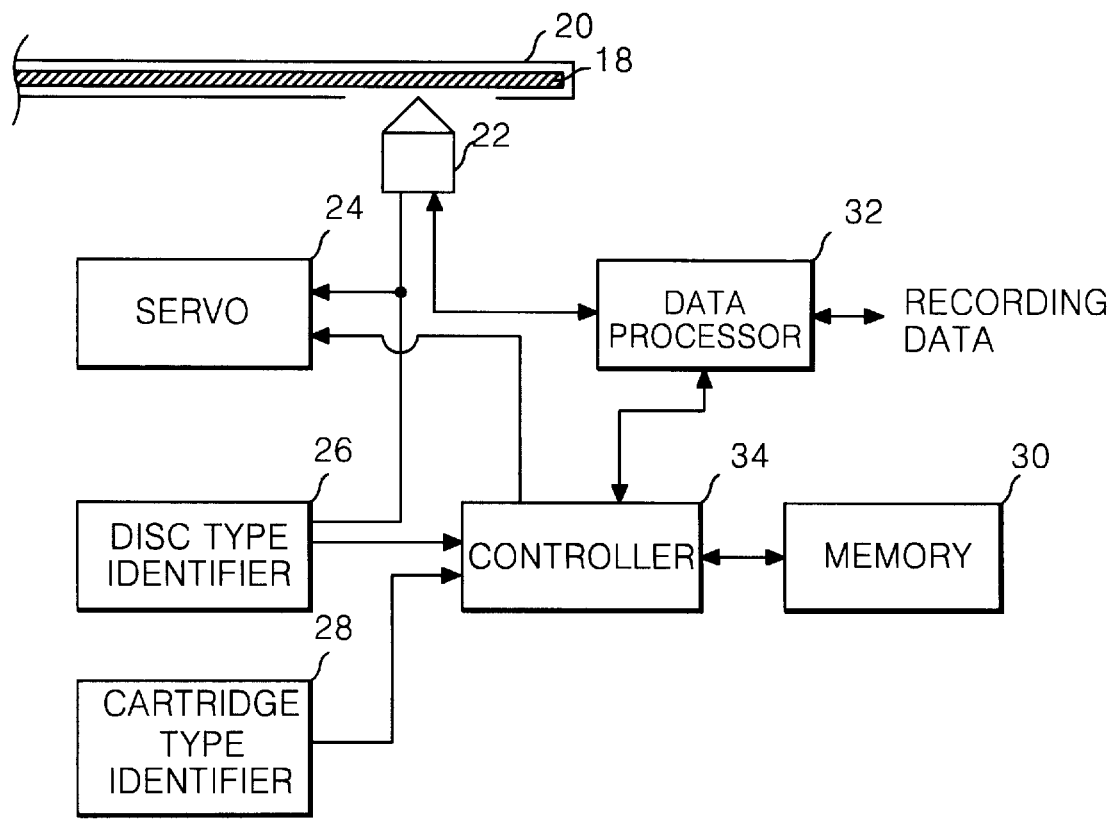
FIG. 4 is a schematic block diagram showing the configuration of a disc recording/reproducing apparatus that is adaptive for driving a disc according to the present invention.

Referring to FIG. 4, there is shown a disc recording apparatus for driving a disc according to the present invention. The disc recording apparatus includes a pickup 22 for accessing a disc 18 received within a cartridge 20, a disc type identifier 26 for identifying whether a disc has a single-sided or double-sided recording layer, and a cartridge type identifier 28 for identifying the type of cartridge. The disc 18 includes a disc identification information indicating that a single-sided recording layer or a double-sided recording layer exists. By this disc identification information, the disc recording apparatus identifies whether a disc to be driven is a single-sided or double-sided disc. The disc identification information is made in the form of flag, pre-pit (embossed pit) or recording mark. Otherwise, it may be made in other forms. The disc identification information is positioned at a specified area such as a lead-in area, a lead-out area and a control data area, etc.

Figure 5:
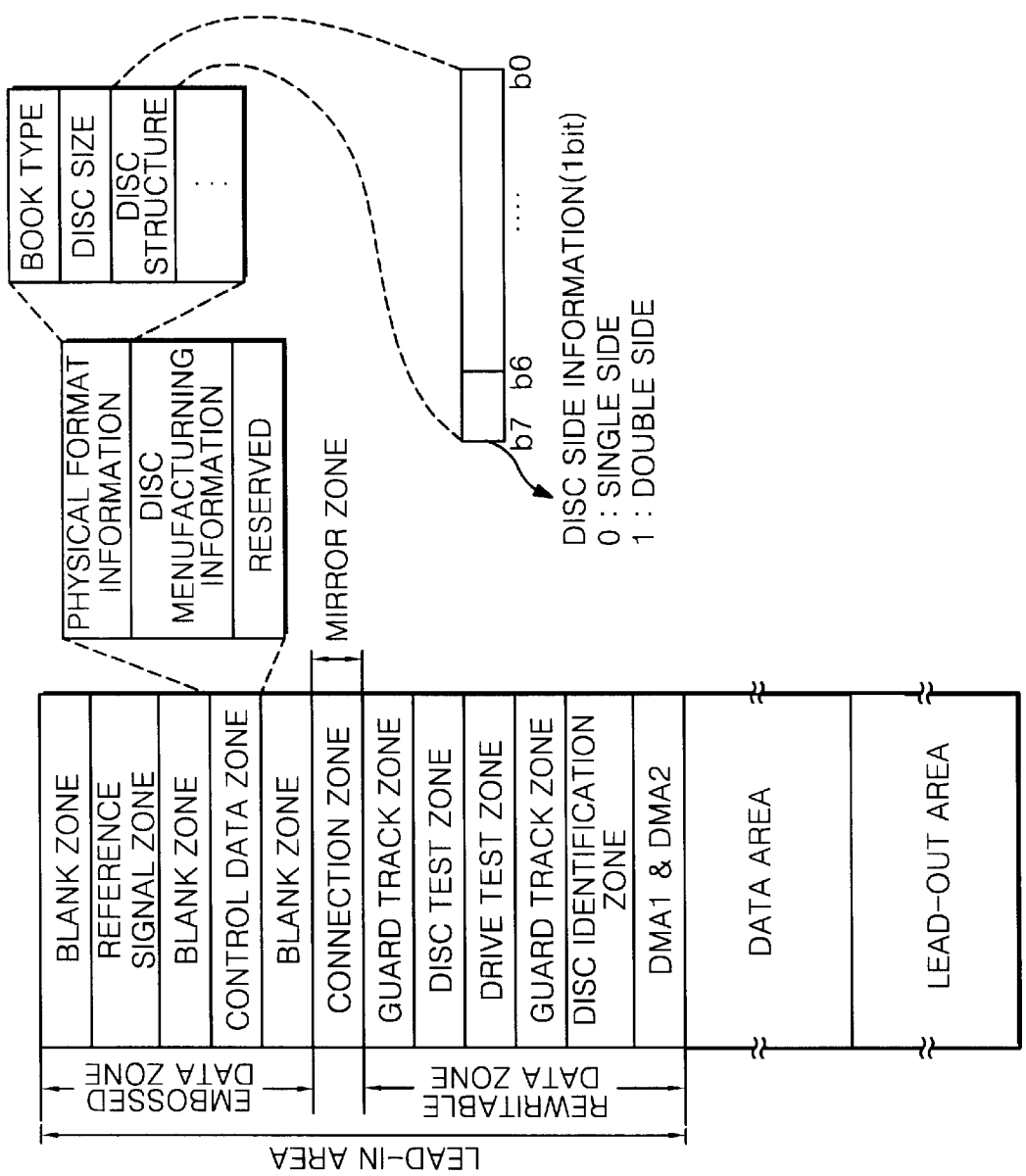
FIG. 5 shows the format of a disc recorded with a disc identification information.

For example, the disc identification information may be recorded in a control zone of a lead-in area in the shape of an embossed data, as shown in FIG. 5. In detail, the disc identification information is included into a disc structure information on a physical format information region. The physical format information region pertains to the control data zone with a disc manufacturing information region and a reserved region, etc. The disc structure information includes 8 bits of data b0 to b7. In the disc structure information, a most significant bit data b7 is assigned to the disc identification information. If the most significant bit data b7 of the disc structure information is a value of "0", the disc identification information indicates that the disc has the single-sided recording layer. Contrarily, the disc identification information represents that the disc has the double-sided recording layer, when the most significant bit data of the disc structure information go to a value of "1". By such disc identification information, the double-sided disc can record a greater data than a recording capacity of the single-sided disc.

Figure 1:
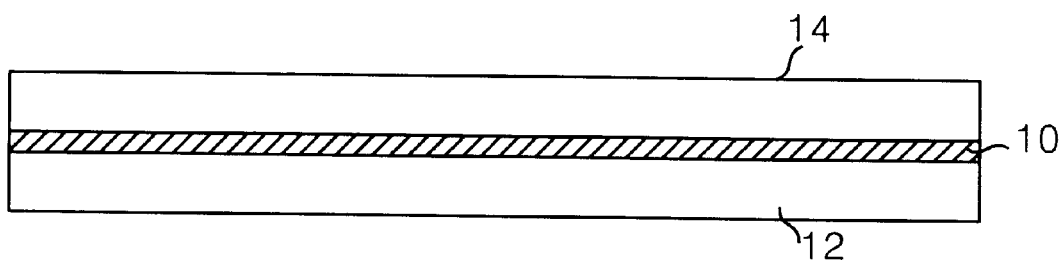
FIG. 1 is a sectional view showing the structure of a conventional single-sided disc.
Figure 2:
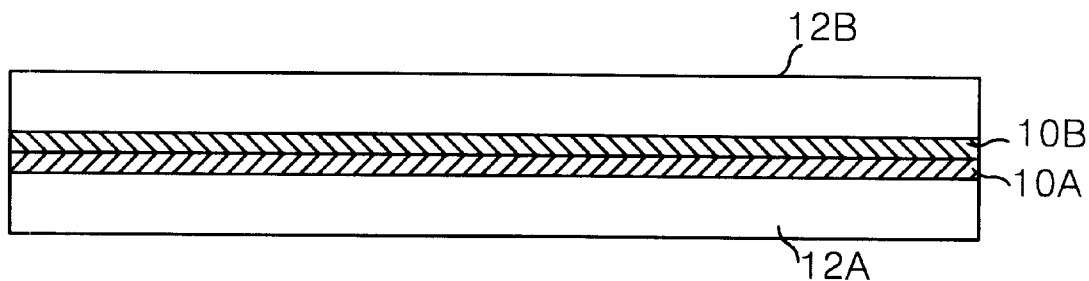
FIG. 2 is a sectional view showing the structure of a conventional double-sided disc.
Figure 3:
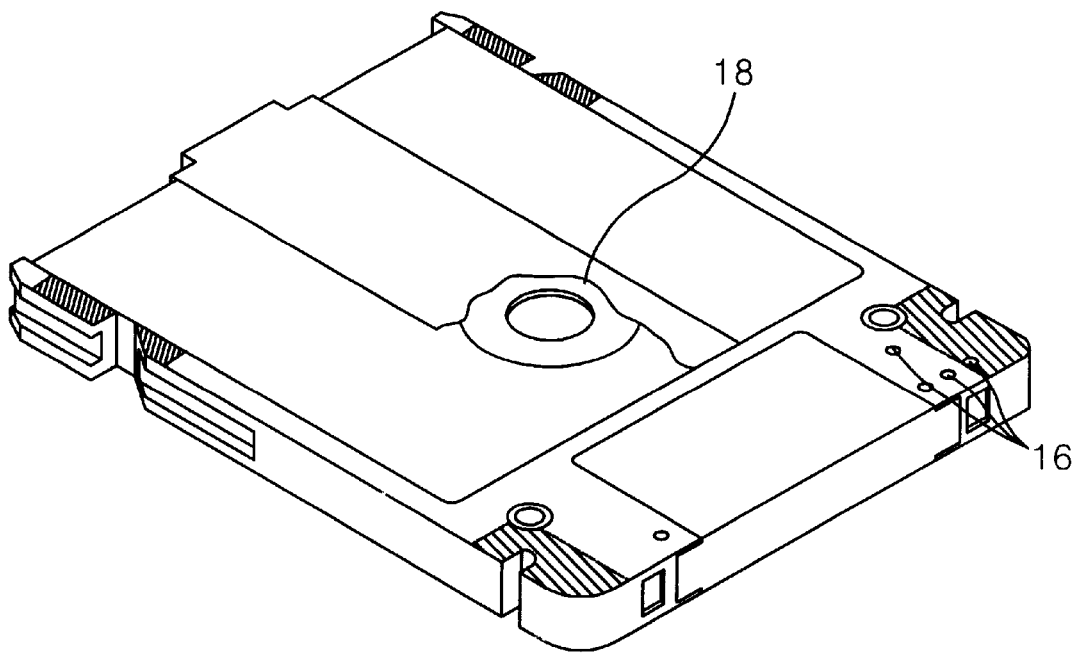
FIG. 3 is a schematic perspective view showing the configuration of a disc cartridge.

As shown in FIG. 3, the cartridge 20 has sensor holes 16 with a different open state in accordance with whether it is a sealed type or an open-closed type. The pickup 22 irradiates a light beam onto a recording layer of the disc 18 to record data or pick up recorded signals. A servo 24 detects tracking and focusing errors from signals from the pickup 22 and controls a state of a light beam irradiated onto the recording surface of the disc 18 depending on the errors. When the cartridge associated with the disc 18 is loaded on the disc recording apparatus, the pickup 22 picks up a disc identification information positioned at a specified region of the disc, and applies the disc identification information to the disc type identifier 26. The disc type identifier 26 determines whether the loaded disc is a single-sided or a double-sided disc on the basis of a logical value of the disc identification information. The disc type identifier 26 generates a disc distinction signal according to the determined result as to the disc. Meanwhile, the cartridge type identifier 28 also determines the type of a cartridge loaded on the disc recording apparatus and generates a cartridge distinction signal according to the determined result as to the cartridge. More specifically, the cartridge type identifier 28 detects an open and closed state of the sensor holes 16 defined in the cartridge 20 and responds to the detected open and closed state of the sensor holes 16, thereby determining whether the loaded cartridge 20 is a sealed type or an open-closed type. In order to detect an open-closed state of the sensor holes 16, the cartridge type identifier 28 is provided with sensors such as photo couplers.

The disc recording apparatus includes a memory 30 for storing a test data, a data processor 32 connected to the pickup 22, and a controller 34 for controlling the servo 24 and the data processor 32. The memory 30 stores a certain pattern of test data to be used during a verification of the disc 18 and a recording control table as described in Table 2. The memory 30 temporarily stores an operational data generated at the time of operation of the controller 34. The data processor 32 intermits a light beam irradiated onto the disc 18 from the pickup 22 in accordance with a recording data applied, via an input/output line 21, from the outside or a test data from the controller 34, thereby writing a recording data into the recording layer of the disc 18. Also, the data processor 32 process signals picked-up from the recording layer 10 of the disc 18 by means of the pickup 22 to reproduce a data written into the recording layer 10. The data reproduced by the data processor 32 is supplied to the controller 34 and the input/output line 21. The controller 34 controls operation of the servo 24 and applies a track jump instruction of the pickup 22, etc. to the servo 24. The controller 34 determines a recording control method on the basis of a disc distinction signal from the disc type identifier 26 and a cartridge distinction signal from the cartridge type identifier 28. In other words, the controller 34 determines whether a verification of disc should be performed prior to a recording of information and whether a recording of information should be performed as described in the following recording control table (Table 2) in accordance with the disc distinction signal and the cartridge distinction signal.

TABLE 2

|  |  | Disc Type | |
|---|---|---|---|
|  |  | Single-sided Disc | Double-sided Disc |
| Cartridge Type | Sealed Type | Verification Process (X) | Verification Process (X) |
|  | Open-Closed Type (Including Bare Disc) | Verification Process (O) | Recording Disable |

More specifically, the controller 34 judges by the cartridge distinction signal whether a loaded cartridge is a sealed type cartridge or an open-closed cartridge. When the loaded cartridge is a sealed type cartridge, the controller 34 controls the data processor 32 in such a manner that a recording of information is performed with a verification of the disc 18 independently of the type of disc 18. At this time, the data processor 32 controls the pickup 22 in such a manner that a light beam irradiated onto the disc 18 is intermitted on the basis of a recording data from the input/output line 21, thereby writing a recording data into the recording layer 10 of the disc 18. On the other hand, when the loaded cartridge is an open-closed type, the controller 34 judges by the disc distinction signal whether the loaded disc 18 is a single-sided or a double-sided disc. If the loaded cartridge is an open-closed type and the disc is a single-sided disc, then the controller 34 allows a recording of information to be performed after a verification of the disc 18. For a verification of the disc 18, the controller 34 supplies a test data stored in the memory 30 to the data processor 32. Then, the data processor 32 controls the pickup 22 in such a manner that a light beam to be irradiated onto the recording layer 10 of the disc 18 on the basis of the test data from the controller 34, thereby writing the test data to the recording layer 10 of the disc 18. In addition, the data processor 32 processes a signal detected by the pickup 32 and reproduces the test data written into the recording layer 10 of the disc 18. The data processor 32 applies the reproduced test data to the controller 34. At this time, the controller 34 checks if the reproduced test data from the data processor 32 is identical to the test data stored in the memory 30 to detect defective areas on the recording layer 10 of the disc 18. When such a verification of the disc 18 is completed, the controller 34 controls the data processor 32 in such a manner that a recording data is written into the recording layer 10 of the disc 18. On the other hand, if the loaded cartridge is an open-closed type and the disc is a double-sided disc, then the controller 34 controls the data processor in such a manner that a recording data is not written into the recording layer 10 of the disc 18. Otherwise, when a disc without being received within the cartridge, that is, a bare disc is loaded on the disc recording/reproducing apparatus, the controller 34 may perform a recording control procedure in the similar manner to the above-mentioned open-closed type cartridge.

Figure 6:
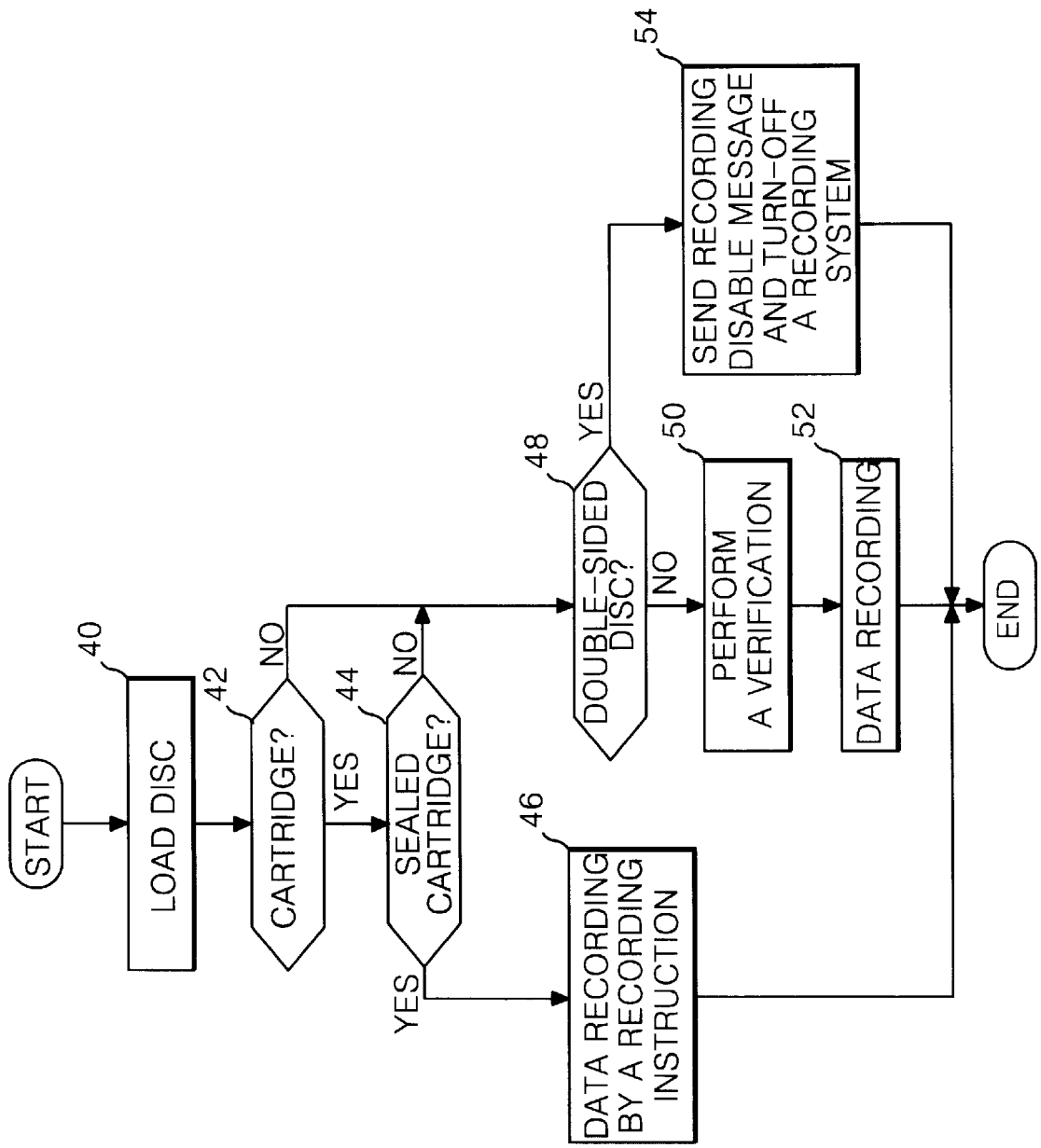
FIG. 6 is a flow chart for explaining a disc recording control method according to an embodiment of the present invention.

FIG. 6 explains a disc recording control method according to an embodiment of the present invention step by step. The disc recording control method of FIG. 6 is performed by means of the disc recording/reproducing apparatus shown in FIG. 4. In step 40, the bare disc or the cartridge 20 received with the disc 18 is loaded onto the disc recording/reproducing apparatus by a user. Once a bare disc or the disc cartridge is loaded, then the controller 34 allows the pickup 22 to pick up a disc identification information from a specified region (e.g., a lead-in area, a lead-out area or a control data area) of the disc 18 by controlling the pickup 22 using the servo 24. At this time, the disc type identifier 26 judges whether the loaded disc 18 is a single-sided or a double-sided disc depending on the disc identification information from the pickup 22, and applies a disc distinction signal according to the judged result to the controller 34. Meanwhile, the cartridge type identifier 28 also senses an open or closed state of the sensor holes 16 defined in the cartridge 20, and judges by the open or closed state of the sensor holes 16 whether the loaded cartridge 20 is a sealed type or an open-closed type. When the sensor holes 16 are not sensed, the cartridge type identifier 38 determines that the cartridge 20 has not been loaded. The cartridge type identifier 28 applies a cartridge distinction signal to the controller 34 in accordance with such a determined result. Then, in step 42, the controller 34 judges by a logical value of the cartridge distinction signal from the cartridge type identifier 28 whether or not the cartridge 20 is loaded. If it is determined that the cartridge 20 has been loaded in the step 42, then the controller 34 judges by the cartridge distinction signal whether the loaded cartridge is a sealed type or an open-closed type. In step 46, if it is determined that a sealed type cartridge has been loaded in the step 44, then the controller 34 allows a recording data to be written into the recording layer 10 of the disc 18 by controlling the data processor 32. As a result, when the sealed type disc cartridge is loaded, a recording of information is performed without a verification of disc. On the other hand, in step 48, if it is determined that a cartridge has not been loaded in the step 42 or if it is determined that a sealed type cartridge has not been loaded in the step 44, the controller 34 judges whether the loaded disc 18 is a single-sided disc or a double-sided disc on the basis of the disc distinction signal from the disc type identifier 26. In step 50, when it is determined that a single-sided disc has been loaded in the step 48, the controller 34 verifies the disc 18 with the aid of a certain pattern of test data stored in the memory 30. In other words, the controller 34 checks if defective areas exist in the single-sided disc. Subsequently, in step 52, the controller 34 allows the data processor 32 to record a recording data on the single-sided disc by controlling the data processor 32. Otherwise, in step 54, if it is determined that a double-sided disc has been loaded, then the controller 34 displays a message indicating a disable recording on a display device (not shown) and, at the same time, prevents a recording of information from being performed by turning-off a recording system including the data processor 32. At this time, even when an interrupt according to a user's key input occurs, the controller 34 does not carry out a recording of information. As described above, the disc recording control method according to the present invention prevents a data from being recorded on the double-sided disc in a bare disc state or on the double-sided disc received within an open-closed type cartridge. Accordingly, the disc recording control method according to the present invention can prevent an excessive enlargement of recording time due to a double-sided disc in which defective areas has excessively been generated from a contamination and an impact, etc. undergone upon its exposure. Also, the disc recording control method according to the present invention does not disappear an information important to the user at recording due to the defect of the double-sided disc.

Figure 7:
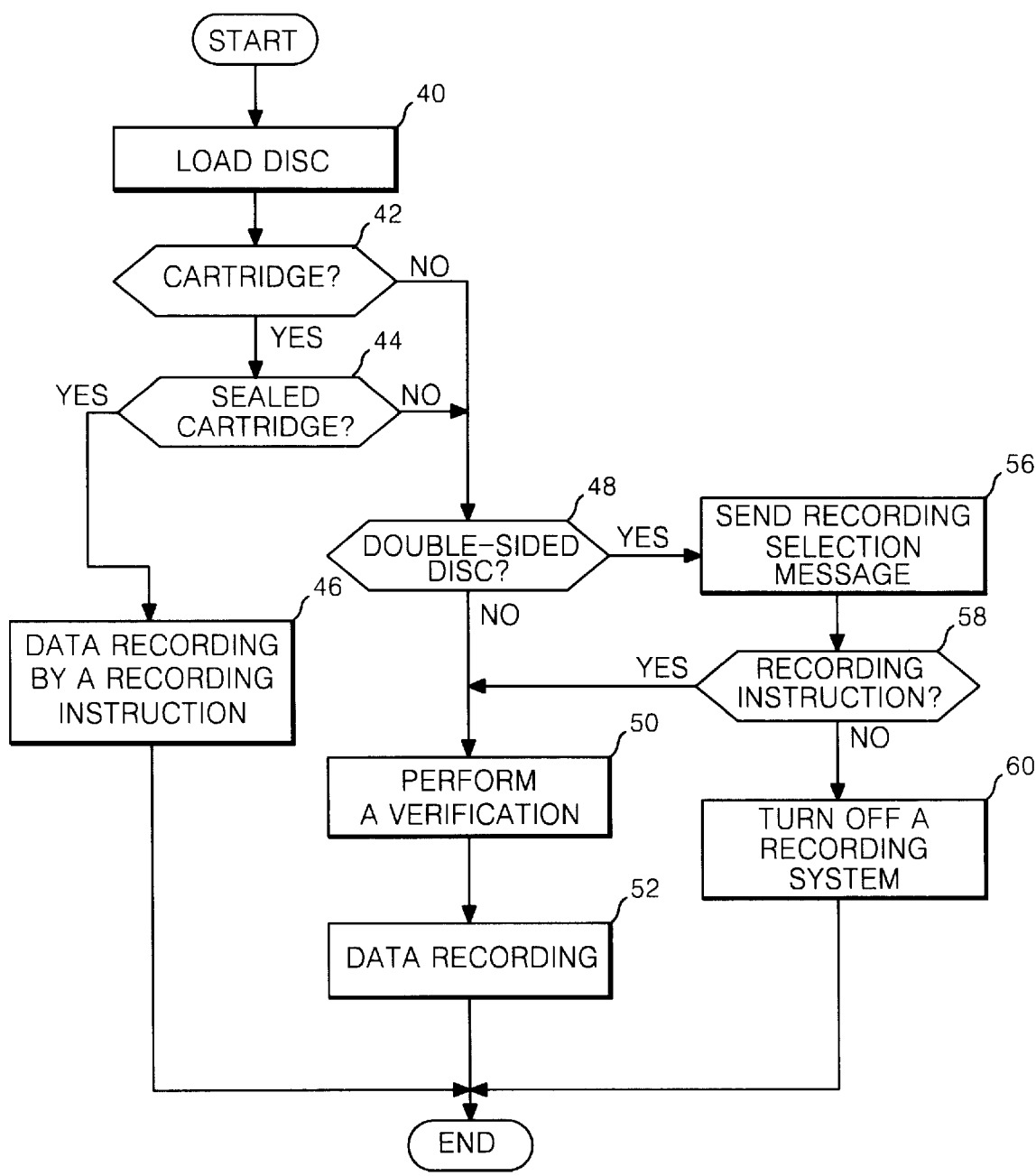
FIG. 7 is a flow chart for explaining a disc recording control method according to another embodiment of the present invention.

FIG. 7 explains a disc recording control method according to another embodiment of the present invention. When an exposed double-sided disc is dealt in such a manner that defective areas due to a contamination, etc. are not generated, the disc recording control method allows a data to be recorded on the exposed double-sided disc by a user's choice. Since the disc recording control method of FIG. 7 includes the same control procedure such as the step 40 to the step 52, an explanation as to the control procedure will be omitted. In step 56, if it is determined that a double-sided disc in a bare state or a double-sided disc received within an open-closed type cartridge has been loaded from the steps 40, 42 and 48 in FIG. 6, then the controller 34 displays a message indicating that a double-sided disc has been loaded in an unacceptable state together with a message inquiring about a recording on a display device (not shown). Subsequently, in step 58, the controller 34 checks if a recording instruction requesting the performance of a recording of information over a key input device (not shown) from a user has been inputted. If a recording instruction is inputted in the step 58, then the controller 34 allows the steps 50 and 52 to be carried out sequentially, thereby writing a recording data onto the double-sided disc. On the other hand, in step 60, when a recording instruction has not been inputted in the step 58, the controller 34 prevents a recording of information from being performed by turning-off a recording system including the data processor 32.

FIG. 8 explains a disc recording control method according to still another embodiment of the present invention. When an exposed double-sided disc is dealt in such a manner that defective areas due to a contamination, etc. are not generated, the disc recording control method allows a data to be recorded on the exposed double-sided disc by an individual judgment of the recording/reproducing apparatus (i.e., the controller). Since the disc recording control method of FIG. 8 includes the same control procedure such as the step 40 to the step 52, an explanation as to the control procedure will be omitted. In step 62, if it is determined that a double-sided disc in a bare state or a double-sided disc received within an open-closed type cartridge has been loaded from the steps 40, 42 and 48 in FIG. 7, then the controller 34 itself determines on the basis of a system environment whether or not a recording of information should be performed. If it is determined that a recording of information has been performed in the step 62, then the controller 34 allows the step 50 and the step 52 to be carried out sequentially, thereby writing a recording data onto the double-sided disc. On the other hand, in step 64, if it is determined that a recording of information has not been carried out in the step 62, then the controller 34 displays a message indicating a disable recording on a display device (not shown) and, at the same time, prevents a recording of information from being performed by turning-off a recording system including the data processor 32.

As described above, in the rewritable disc according to the present invention, an identification information indicating whether a single-sided or a double-sided recording layer exists is included in a specified region of the disc. Accordingly, a continuity of data is assured at the double-sided recording layer included in the double-sided disc and, furthermore, a greater data than a recording capacity of the single-sided disc can be recorded on the double-sided disc. In addition, the disc recording apparatus can control a recording operation appropriately depending on a loaded state of the single-sided and double-sided discs.

Further, the disc recording control method according to the present invention performs a recording operation selectively depending on an identification information indicating that the disc is a single-sided or a double-sided disc. By the recording control method according to the present invention, the disc recording apparatus can effectively cope with a disc defect, etc. Also, the recording control method according to the present invention prevents a recording time from being excessively lengthened. Furthermore, the disc recording control method according to the present invention does not disappear an information important to the user at recording due to the defect of the double-sided disc.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A disc recording control method, comprising the steps of:

identifying a disc cartridge as an open-closed type cartridge;

determining whether a disc identified as being in an open-closed type cartridge is a double-sided disc; and disabling the recording of data on the disc when it is determined that the disc is a double-sided disc.

2. The disc recording control method as claimed in claim 1, wherein a determination as to the type of disc is made depending on an identification information included in the disc.

3. The disc recording control method as claimed in claim 1, further comprising:

if it is determined that a disc is not a double-sided disc, verifying whether the disc is a single-sided disc.

4. A disc recording control method, comprising the steps of:

identifying a disc cartridge as an open-closed type cartridge;

judging whether the disc is a double-sided disc; and determining whether a recording of data on the disc when it is judged that the disc identified as being in an open-closed type cartridge is a double-sided disc.

5. The disc recording control method as claimed in claim 4, wherein a judgment as to the type of disc is made depending on an identification information included in the disc.

6. The disc recording control method as claimed in claim 4, wherein a determination as to the recording of the disc is made depending on a user's instruction.

7. The disc recording control method as claimed in claim 4, wherein a determination as to the recording of the disc is made depending on a system environment.

8. A disc recording control apparatus, comprising:

means for identifying a disc as an open-closed type cartridge;

means for determining whether a disc received in an open-closed type cartridge is a double-sided disc; and control means for suspending a recording of data on a double-sided disc in an open-closed type cartridge depending on outputs of the cartridge checking means and the disc determining means.

9. The disc recording control apparatus as claimed in claim 8, wherein the disc determining means detects the double-sided disc depending on an identification information included in the disc.

10. The disc recording control apparatus as claimed in claim 8, wherein the control means allows a data recording to be carried out after a verification of a disc when the disc is a single-sided disc.

11. A disc recording control apparatus, comprising:

means for checking that a disc has been received within an open-closed type cartridge means for judging that the disc is a double-sided layer; and control means for determining a recording of the double-sided disc depending on outputs of the cartridge checking means and the disc judging means.

12. The disc recording control apparatus as claimed in claim 11, wherein the disc judging means detects the double-sided disc depending on an identification information included in the disc.

13. The disc recording control apparatus as claimed in claim 11, wherein the control means determines the recording of the double-sided disc depending on a user's instruction.

14. The disc recording control apparatus as claimed in claim 11, wherein the control means determines the recording of the disc depending on a system environment.

* * * * *